United States Patent [19]
Finkelstein et al.

[11] Patent Number: 5,185,733
[45] Date of Patent: Feb. 9, 1993

[54] CALIBRATING LASERS FOR OPTICAL RECORDING USING A MAXIMAL READBACK SIGNAL AMPLITUDE AS A CRITERION

[75] Inventors: Blair I. Finkelstein; Morovat Tayefeh, both of Tucson, Ariz.; Hideo Ueno, Yamato, Japan

[73] Assignee: International Business Machines Corporation, Armonk, N.Y.

[21] Appl. No.: 486,840

[22] Filed: Mar. 1, 1990

[51] Int. Cl.$^5$ ............................................. G11B 7/125
[52] U.S. Cl. ...................................... 369/54; 369/58; 369/116
[58] Field of Search ...................... 369/116, 53, 54, 58, 369/59, 32, 44.34, 44.27, 44.31, 44.12, 106, 112, 47, 50

[56] References Cited

U.S. PATENT DOCUMENTS

| | | | |
|---|---|---|---|
| 3,988,531 | 10/1976 | Laub | 178/6.6 |
| 4,142,208 | 2/1979 | Oprandi et al. | 358/127 |
| 4,549,288 | 10/1985 | Chan | 369/48 |
| 4,562,567 | 12/1985 | Frankfort et al. | 369/106 |
| 4,631,713 | 12/1986 | Romeas et al. | 369/54 |
| 4,731,773 | 3/1988 | Lewkowicz | 369/59 |
| 5,050,156 | 9/1991 | Barton | 369/116 |

FOREIGN PATENT DOCUMENTS

116204 8/1984 European Pat. Off. .
45117 8/1985 European Pat. Off. .

*Primary Examiner*—Wayne R. Young
*Assistant Examiner*—Muhammad Edun
*Attorney, Agent, or Firm*—H. F. Somermeyer

[57] ABSTRACT

A magnetooptic recorder uses a magnetooptic disk for any predetermined number of radially inward tracks which are designated as calibration tracks. One of the calibration tracks is selected as a laser calibration track. The selected track is high powered erased and a test pattern is written on the track. A test pattern is repeated at diverse levels of laser recording power. A test pattern preferably includes or is limited to the highest frequency to be recorded in the ensuing data recordings. The recorded test pattern is read back with the readback signal amplitude being envelope indicated and detected. A table of signal envelope values is created in a digital computer. The values then are fit to a curve using second order polynomial curve fitting techniques. The maximal readback signal amplitude is then selected from the curve corresponding to laser write power used to obtain that maximum signal amplitude and is then selected as a criteria for indicating the laser write power as well as the erase write power.

28 Claims, 3 Drawing Sheets

CALIBRATING LASERS FOR OPTICAL RECORDING USING A MAXIMAL READBACK SIGNAL AMPLITUDE AS A CRITERION

FIELD OF THE INVENTION

The present invention relates to optical disk recorders, particularly to calibration of lasers in such disk recorders. The invention is particularly useful for use with magnetooptic recording media.

BACKGROUND OF THE INVENTION

Some optical disk recorders employ constant lineal speed control, i.e., as the laser beam scans radially more outward tracks, the rotational speed of the disk is reduced to maintain a constant lineal track scanning speed. Such recorders are often employed for audio and video recording. On the other hand, data recording devices, such as those used with computers and the like, employ a constant rotational speed. It is to be appreciated that at a constant rotational speed a signal of a given duration is recorded as a longer mark in a radially-outward track on the disk than when recorded on one of the radially-innermore tracks. In pulse-position-modulation (PPM) recording, the change in recorded mark lengths create different recording tolerances at different radii of the disk. Different recording formats also result in different recording tolerances. Since the scanning time for the different length marks is relatively constant, slight variations in speed and responsiveness of the recording media, particularly magnetooptic media, can be tolerated. However, when an encoding method known as pulse-width modulation (PWM) is employed, then the tolerances required for successful readback of the recorded information are reduced. PWM provides for higher linear recording densities than PPM. In pulse-width modulation the duration of a pulse recorded on a record track is varied for indicating different informational values. For example, a relatively short duration pulse would represent binary zero, a slightly longer pulse represents a binary one, a yet longer pulse representing a two, and so forth. A single recorded pulse can represent a number up to modulo 10 or 16. Pulse-width modulation greatly enhances the data storing capability of a record media. It is to be appreciated that this greater storage capability comes at a severe price in that distinguishing between various pulse lengths is usually a difficult readback operation, particularly for interchangeable media. That is, one recorder may record pulses which tend to be long while another recorder records pulses which tend to be short. Somewhere in between the short and long pulses a region of ambiguity exists as to the informational content of a given pulse may not be reliably and readily determined even by sophisticated and complex readback circuits. Accordingly, it is desired to provide a uniformity in recording for facilitating pulse-width modulation of information-bearing signals onto optical media such that not only is signal readback improved and facilitated, but that interchange of media among a plurality of recorders is made more reliable. Optical recording has used constant intensity laser beams for creating recorded pulses on optical media. It is also well known that pulsed or "serrated" writing signals can also be applied. That is, a series of short duration pulses can effectively record a single long pulse on the record medium. Thermal diffusion of the heat induced into the recording layer by the recording laser beam also causes distortion of the recorded pulse in optical recording. It is desired to minimize the negative effects of such thermal diffusions by carefully calibrating the laser write pulses to provide a uniformity of recording among a plurality of optical disk recorders.

DISCUSSION OF PRIOR ART

Frankfort et al. in U.S. Pat. No. 4,562,567 disclose an ablative optical recording in which information is recorded in the form of optically-detectable, ablative changes in the optical medium in the form of pits. As soon as a pit is initiated by ablation, the intensity of the laser beam is reduced for forming more accurate pits. A change in the reflectivity of the optical media indicates the onset of pit formation. Such a luxury is not found in magnetooptic recording. Even with this type of control, there is no assurance that the accuracy of the pits is maintained from various optical media to other optical media. Therefore, it is still desired to provide for a laser calibration which ensures consistency among a plurality of optical recording media. Romeas et al. in U.S. Pat. No. 4,631,713 shows recording a binary test word on an optical disk comprising a monotonous series of one and zero logic bits of equal duration. Then reading those recorded words and measuring the duration in the bits in the one and the zero state enables calibrating the recording laser to obtain ones and zero recordings of equal duration (pulse-width). The calibration is setting the optical power of the laser to create one and zero recorded indices of equal circumferential duration. It is known that alternate ones and zeros are the highest recording frequency resulting in the shortest duration or spacing between successive transitions (this statement is true for NRZ or NRZI formats).

According to Romeas, test tracks are provided at the beginning and end of the disk (innermost- and outermost- radial tracks) for producing a correction factor for engraving (recording) power as a function of radius, i.e., the change in engraving power apparently is linear with radius. Once the correct optical power value is determined, then that power is used to carry out all the recordings that follow until it is judged useful to actuate a new test. The periodicity of such tests were determined by the operator or automatically according to a computer program (not disclosed). For example, at the loading of a new disk in the engraving reading apparatus or at regular time intervals such as 48 hours. It appears that Romeas does not address all of the variables necessary for providing a desired precise recording of optical media, i.e., only power value is changed.

The Lewkowicz U.S. Pat. No. 4,731,773, shows a magnetooptic recorder having a write control which tends to reduce unwanted radial enlargement of a recorded mark on a disk. The shape of the heat inducing pulse is altered from an initial high recording initiating value to a recording sustaining value such that the resulted recording in the track is substantially uniform width along the length of the track being scanned. Lewkowicz teaches that the control reduces synchronous noise, i.e., second harmonic noise; yet greater correction and control of the writing process is required for successful high lineal density pulse-width-modulation recording.

The European Patent Office patent 45,117, by Discovision Associates, shows an ablative recorder which adjusts the laser power for minimizing second harmonic (synchronous noise) distortion in optical recording.

While the reduction of synchronous noise is certainly important, the reduction of synchronous noise does not indicate any control of pulse duration necessary for effecting reliable pulse-width modulation and for high-density pulse-position modulation recording schemes for obtaining a maximal readback signal quality.

European Patent Application 116,204 teaches that a real-time feedback system adjusts the output power of the write laser or similar source for adjusting the modulation timing of a write beam. This adjustment nulls out any unwanted DC component that is exhibited by the recorded data. The feedback is achieved by a read-after-write operation. The patent application teaches that this feedback stabilizes the timing of the transitions in the recorded area. The unwanted DC component is an example of asymmetry occurring in recorded pulses. While this invention provides for accurate recording, it does require read-after-write capabilities, i.e., a multiple-beam head. Such a multiple-beam head adds to the cost of the recorder apparatus. It is desired to provide for precise recording with either a single-beam system or with a recorder such as that described in the European Patent Application which is initially set by a precise calibration technique.

Laub, in U.S. Pat. No. 3,988,531, shows a system for compensating for pulse-length variations during readback. Such unintended length variations may give rise to duty factor errors. According to Laub, the compensating changes are made to the duty factor of the signal developed while reading the disk. These changes obviate spurious components attributable to duty factor error in image reproduction. Laub describes an ablative system which employs ablated pits for indicating information with unablated areas constituting a spatial representation of a carrier signal frequency modulated by a band of video components. In the presence of duty factor error, the modulating component produces spurious counterparts in the baseband. In read-after-write, a photoreceptor responds to the reading of the record track with a beam of energy to derive an output signal representative of the frequency modulated carrier. In the presence of duty factor error, the output signals are further representative of the spurious component and have a phase and intensity indicative of the sense and extent of the duty factor error. The frequency selector derives the spurious component from the output of the photoreceptor. A compensator having means responsive to the derived output signal develops a first set of timing signals. Means responsive to the drives spurious component is included for selectively delaying alternate transitional portions of the drive output signal by an amount related to the amplitude of the spurious component for developing a series of adjusted width pulses. The means responds to the adjusted width pulses served to develop a second set of timing pulses. Finally, means are responsive to the first and second set of timing signals to provide for generating a signal having a duty factor corresponding to a desired duty factor. While a carrier signal is used in video recording, audio and data recording are always baseband recording without a carrier. Therefore, this solution to a change in duty factor is not useable in a data baseband recording environment, nor does it appear to provide a complete control of recorded pulses so as to enable high density pulse-position modulation (PPM) nor pulse-width modulation (PWM).

Another duty factor correction system is shown by Oprandi et al., in U.S. Pat. No. 4,142,208. A feedback loop is provided for correcting the duty factor of a restored rectangular waveform when its value deviates from the value 0.5.

Chan, in U.S. Pat. No. 4,549,288, shows optical data recording apparatus which enhances a playback signal by comparing the lengths of the lands on a recording medium with the lengths of the pits. The playback signal is then changed to represent equality between such lengths. It is preferred to effect correction at the recording portion rather than relying on readback signal compensation techniques.

SUMMARY OF THE INVENTION

It is an object of the present invention to provide laser write calibration for an optical disk recorder usable with any combination of code pulse patterns and which accommodates parameters of the record medium and its environment within a record player.

In accordance with the invention, method and apparatus for calibrating a laser of an optical disk player comprises recording a test pattern on the record medium using a plurality of recording levels, measuring the amplitude of signals read back from the recorded test patterns and then selecting one of the recording levels which resulted in a maximal readback signal amplitude as a level of laser power for ensuing recording on the record medium.

In a more particular aspect of the invention, a large plurality of signals are recorded at the respective diverse laser power levels the readback of the recorded signals at each of the respective laser power levels are averaged. The average readback signal amplitudes are then compared with a maximum average signal amplitude read back indicating which laser power level is to be used for ensuing recording. In another aspect of the invention, the envelope of the readback signal is used to indicate the amplitude of the readback signal. It is preferred that the test pattern represent the highest frequency components, i.e. the shortest one-half wavelengths, to be used in the ensuing recording.

The foregoing and other objects, features and advantages of the invention will be apparent from the following more particular description of preferred embodiments of the invention, as illustrated in the accompanying drawings.

DETAILED DESCRIPTION

Figure 1:
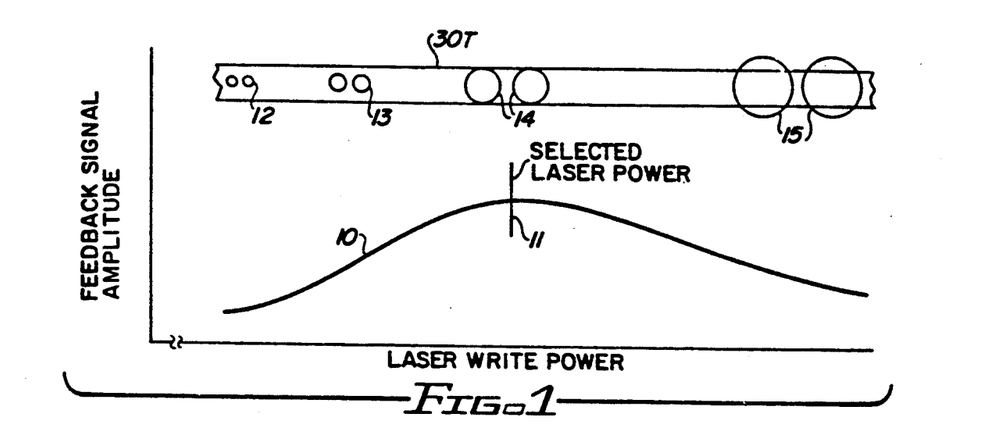
FIG. 1 is a diagrammatic illustration of practicing the present invention.

Referring now more particularly to the drawing, like numbers indicate like parts and structural features in the various figures. Referring firstly to FIG. 1, curve 10 represents the relationship of readback signal amplitude with respect to laser write power. The laser write power increases from the left along the horizontal ordinant which results in various size recorded spots 12-15 along a signal record track 30T. It has been determined that data signals should be recorded when the readback signal amplitude as indicated by curve 10 reaches a maximum or near a maximum as indicated by vertical line 11. Using the laser power represented by the maximum signal amplitude provides an optimum recording laser power level for ensuring precise and faithful digital recording on record media. That is, quality of the readback signal is a strong function of the marks 12-15 recorded on an optical record medium, particularly magnetooptic (MO) record media. When the recorded marks are too small, such as marks 12-13, the effective light reflected from the record medium results in a reduced readback signal amplitude. Further, when the marks are too large, (such as marks 15) then because of inter-symbol interference, as will become apparent, reduces the effective readback amplitude and also results in undesired peak shifting of the readback signal, which can cause signal detection errors. It is desired to produce recording marks, the size of marks 14, which result in a maximal readback signal amplitude and minimum peak shift. At either extremes of too small a mark or too large a mark, the signal to noise ratio (SNR) reduces while jitter and peak shift increases, which reduces the probability of detecting the marks within a detection window as is known. Further, the mark size is also a strong function of the signal storage media sensitivity, the ambient temperature in which the media resides, the recording pulse durations, spot size, laser power relative linear velocity of the media as it passes by the recording laser beam and the amplitude of a magnetic bias or steering field used in magnetooptic recording. In other forms of recording, magnetic bias field is not used and is not a parameter.

Figure 2:
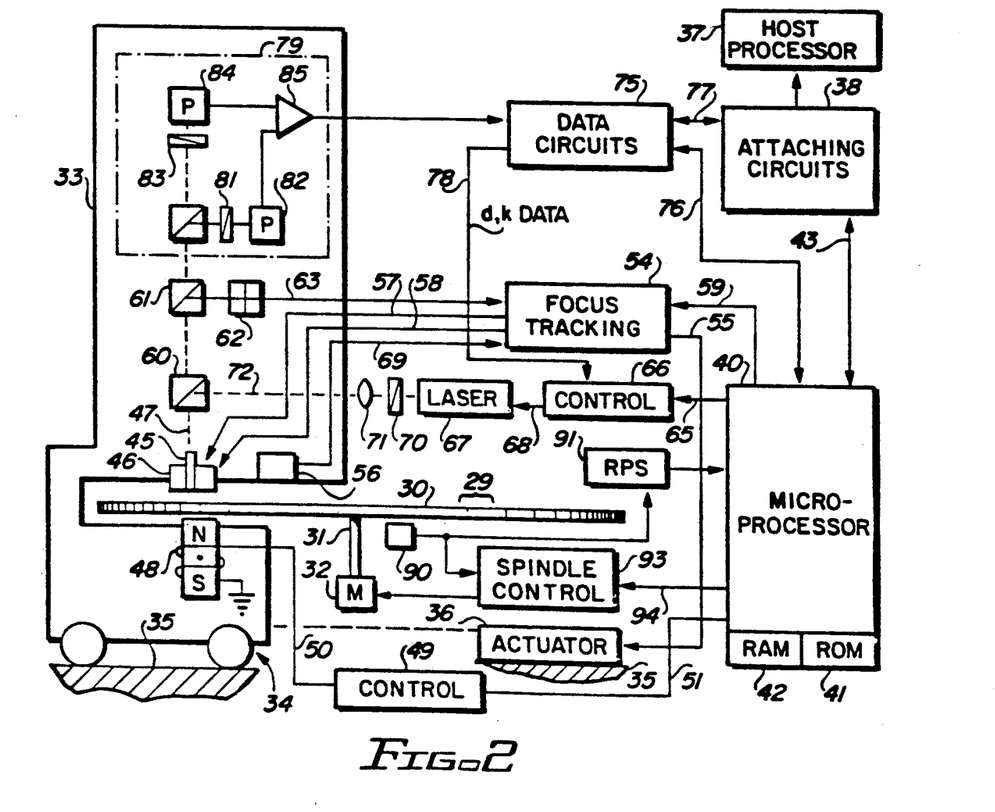
FIG. 2 is a diagram of an optical recorder-player in which the invention of FIG. 1 may be advantageously practiced.

An optical recorder with which the present invention may be advantageously employed is shown in FIG. 2. A magnetooptic record disk 30 is mounted for rotation on spindle 31 by motor 32. Optical head-carrying arm 33 on head-arm carriage generally denoted by numeral 34 moves radially of disk 30. A frame 35 of recorder suitably mounts carriage 34 for reciprocating radial motions. The radial motions of carriage 34 enable access to any one of a plurality of concentric tracks or circumvolutions of a spiral track for recording and recovering data on and from disk 30. Linear actuator 36 suitably mounted on frame 35, radially moves carriage 34 for enabling track accessing. The recorder is suitably attached to one or more host processors 37, such host processors may be control units, personal computers, large system computers, communication systems, image process processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42. Microprocessor 40 controls the laser calibration, as will become apparent.

The optics of the recorder include an objective or focussing lens 45 mounted for focussing and tracking motions on head arm 33 by fine actuator 46. This actuator includes mechanisms for moving lens 45 toward and away from disk 30 for focussing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 in a constructed embodiment (magnet 48 is an electromagnet) provides a weak magnetic steering or bias field for directing the remnant magnetization direction of a small spot on disk 30 illuminated by laser light from lens 46. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones are recorded on disk 30 normally are "north pole remnant magnetization". To erase disk 30, magnet 48 reverses its magnetic field such that the south pole is adjacent disk 30. Magnet 48 control 49 which is electrically coupled by line 50 to electromagnet 48 controls the write and erase directions of the electromagnet 48 produced magnetic steering field. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 36. The positioning of carriage 34 by actuator 36 is precisely controlled by control signals supplied by circuits 54 over line 55 to actuator 36. Additionally, the actuator control by circuits 54 is exercised by control signals travelling over lines 57 and 58 respectively for focus and fine tracking and switching actions of fine actuator 46. Sensor 56 senses the relative position of fine actuator 46 to head arm carriage 33 and supplies a relative position signal over line 69.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photo elements which respectively supply signals on four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is supplying a steering field for recording data. Microprocessor 40 supplies a control signal over line 65 to laser control 66 for indicating that a recording operation is to ensue. This means that laser 67 is energized by control 66 to emit a high intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67. Data circuits 75 supply data or write pulses over line 78 to control 66 for modulating the operation of semiconductor laser 67 in a known manner. The laser 67 modulated light beam passes through polarizer 70 (linearly polarizing the beam), thence through collimating lens 70 toward half mirror 60 for being reflected toward disk 30 through lens 45. Data circuits 75 are prepared for recording and the microprocessor 40 supplied suitable control signals over line 76. Microprocessor 40 includes control circuits for effecting and controlling machine operations that occur too fast for being effected and controlled by microcode execution. Microprocessor 40 in preparing circuits 75 is responding to commands for recording received from a host processor 37 via attaching circuits 38. Once data circuits 75 are prepared, data is transferred directly between host processor 37 data circuits 75 through attaching circuits 38. Data circuits 75 also ancillary circuits (not shown) relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head arm 33 optics. Half-mirror or beam splitter 80 divides the reflected beam into two equal intensity beams, both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photo cell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical sensing type that senses dark and light spots on a tachometer wheel (not shown) of spindle 31, supplies the "tach" signals (digital signals) to rotational position sensing (RPS) circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

Figure 3:
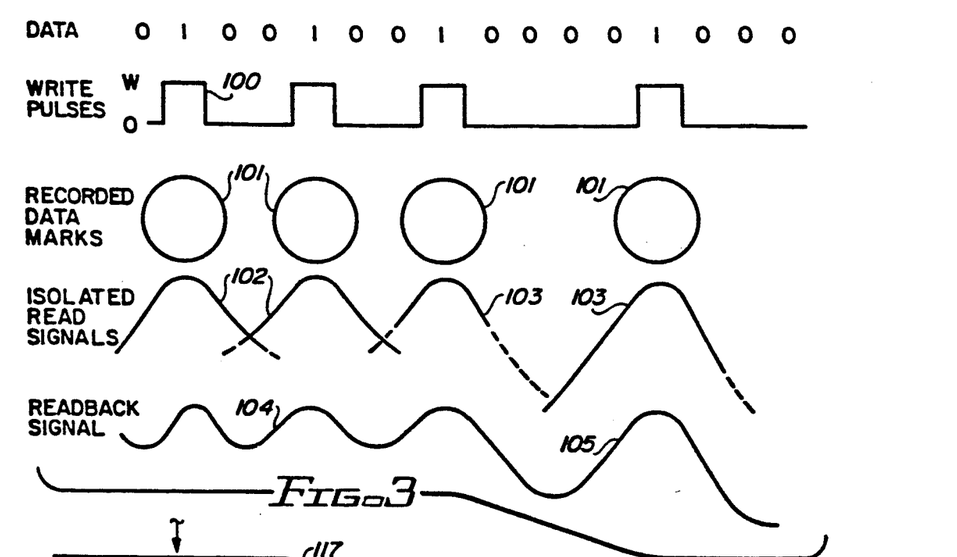
FIG. 3 is a set of idealized optical recording patterns along with representative data for indicating parameters related to the practice of the invention shown in FIG. 1.

Referring now more particularly to FIG. 3, the relationship between pulse-position modulation (PPM) data and the actual signal recorded on a magnetooptic medium illustrates some of the parameters of the operation of the present invention. The illustrated data shows two cycles of pattern 1001 (highest density pattern) and two cycles of pattern 100001 which can be represented as a minimum wavelength and a nominal wavelength of an encoded 2,7 D,K code. The resultant write pulses 100 show the different one-half wavelengths of the recording signal. On the record medium spots 101 are recorded for each of the write pulses respectively. It is to be appreciated that the spots 101 are made circular and are idealized to that extent. When the spots are relatively close together, i.e. at the highest frequency of the data to be recorded, then the readback signal 102 from each of the spots 101 interact to cause a readback signal portion 104 having reduced signal peak amplitudes. However, when the spots 101 are spaced further apart, i.e. at the lower frequency data repetition rates, the isolated read signals 103 are spaced further apart with resultant less intersymbol interference (each mark 101 is considered a symbol). As a result of less intersymbol interference, the readback signal portion 105 has increased signal amplitude. The intersymbol interference of the closely spaced marks 101 can also result in substantial peak shift of the peaks in the portion 104. The size of the recorded data marks 101 is effected by all of the parameters stated above with respect to FIG. 1. An easy way to control the size of the marks 101 but optimize the size for the highest frequency of operation is through adjustment of laser power.

Figure 4:
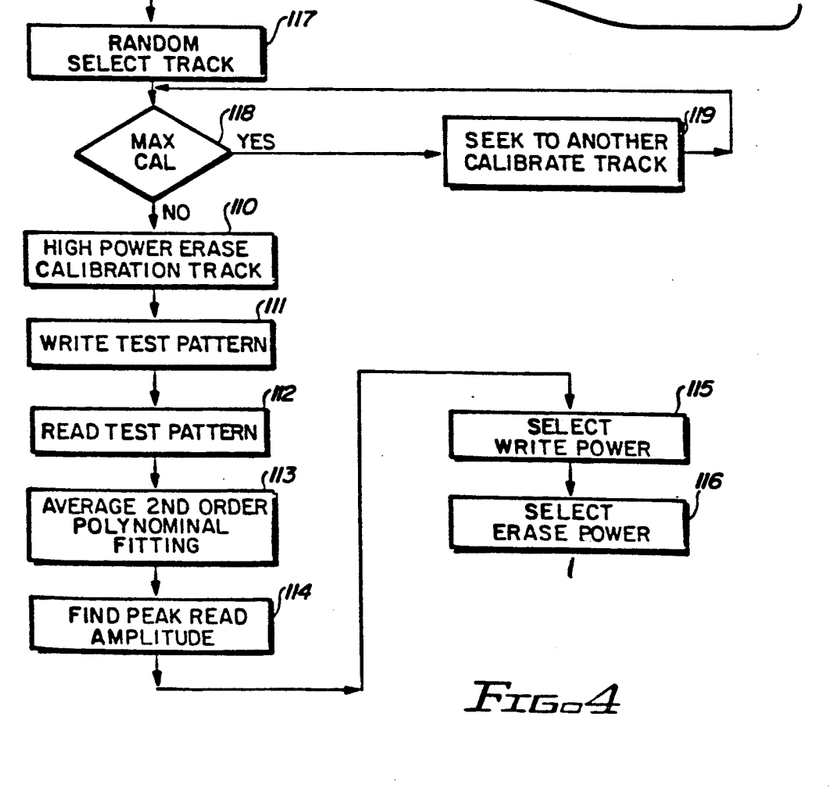
FIG. 4 is a simplified flowchart showing the calibration sequence used to practice the invention in a best mode as shown in FIG. 1.

FIG. 4 is a flowchart which illustrates the practice of the present invention in a constructed embodiment. This flowchart assumes that the focus of laser beam at path 47 has been achieved through the focussing of lens 45 as is known. A plurality of separate calibration tracks 29 are provided at a radial inward portion of disk 30. The initial description assumes that a calibration track has been selected. A first step is to high power erase the calibration track at machine step 110. A high power erase refers to an erasure in which there remains insubstantial residual recording; that is when a data track is erased, the erasure power is less than the writing or recording laser power level. As a result, some residual remnant magnetizations may reside even after erasure, which is not a problem during normal recording, however, it could have an effect on the power calibration and therefore the erasure power is at least at the level of recording. Then at machine step 111, a test pattern is written. In the illustrated embodiment for a 2,7 D,K code the highest frequency of data recording is represented by a three-bit sequence 100 where the binary 1 represents a write pulse and the binary 0's represent allowing the track to remain at the erasure direction. Successive 100 patterns cause a signal pattern as shown in FIG. 3. It is desired to calibrate the laser at the highest frequency because of maximal intersymbol interference which reduces the amplitude of the readback signal as shown in FIG. 3. The test pattern is written in step 111 on the second rotation of disk 30. The test pattern includes repetitions of the 100 pattern at a large plurality of different or diverse laser power levels which will become apparent.

The just recorded test pattern on the calibration track is then read with the readback signal amplitude being envelope detected for measuring and indicating the readback signal amplitude for each of the respective laser power levels used during machine step 111. As will be later described, a plurality of repeated test patterns with identical changes in laser power recording levels may be employed for accommodating aerial variations of media sensitivity. The reading step 112 effects separation of all different power level recordings such that the measured readback signal amplitude can be averaged in machine step 113. Machine step 113 is formed within microprocessor 40 wherein all of the samples amplitudes sensed by machine step 112 and supplied to microprocessor 40 calculates the mean for samples from the test patterns. Curve 10 of FIG. 1 represents the results of such calculations. Microprocessor 40 also can use known curve smoothing algorithms for eliminating out of range data points and do a known curve fitting to generate the curve 10. One curve fitting procedure found effective is a second order polynomial least square fitting algorithm. Once the curve data is generated, then at machine step 114 microprocessor 40 determines which laser power level resulted in a peak amplitude as represented by vertical line 11 of FIG. 1. The actual write power is selected at machine step 115. The selected write power, which would be the most appropriate write power which is a digital to analog converter setting (DAC) that gives a maximal readback signal amplitude for higher signal quality. To ensure highest quality, the calibration operation can be repeated by selecting another track at the radial midpoint of the recording area and then at the outer diameter of the recording area. Then the recording area can be zoned and differing laser power levels can be determined for the inner diameter, middle diameter and outer diameter of the recording zone. The laser power can be adjusted linearly by using interpolation techniques for all of the tracks intermediate, the inner diameter, middle diameter and outer diameter calibration tracks. In many instances, calibrating at the inner diameter is sufficient. The selected write power can be a predetermined percentage of the measured write power, such as 95 percent. The back setting is done by a percentage of the indicated laser power level resulting in the maximum sent readback signal amplitude. Then at machine step 116, microprocessor 40 selects the erase power to be 80 percent of the recording or write power selected in machine step 115. All of the above steps 110–116 assume operation at a selected calibration track.

Figure 8:
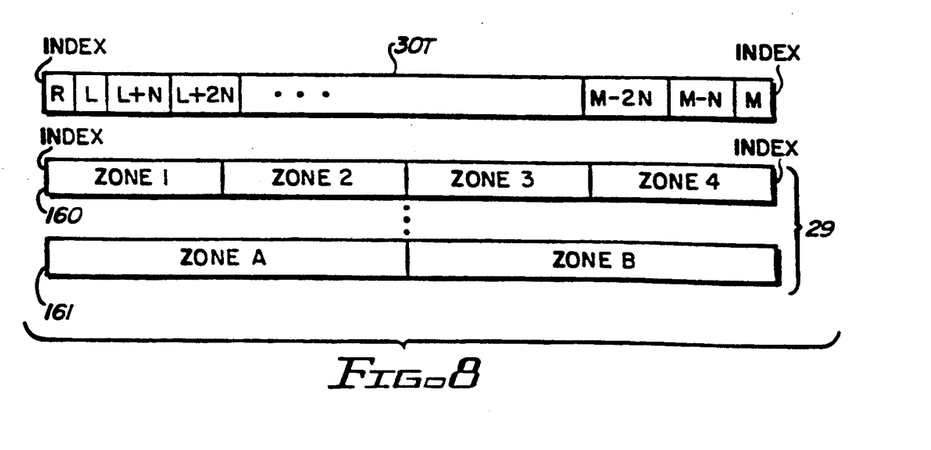
FIG. 8 is a simplified showing of a calibration track used in the practical embodiment of the FIG. 1 illustrated invention.

The selection of a track for calibrating laser power can have a significant effect on the quality of recording. Magnetooptic media is subject to sensitivity shift with time (SST) which can cause variations in recording at the same recording laser power level. The SST for a given record medium is dependent upon the composition of the magnetooptic layer as well as other manufacturing techniques used in making a record medium. On some magnetooptic media the SST results in a reduced sensitivity to laser recording; i.e., a smaller mark 101 is generated for the same level after an SST has occurred for the MO medium. In other compositions, the SST is toward increased sensitivity wherein a larger mark 101 occurs in those areas being subject to SST, therefore it is desired to calibrate the laser on those tracks not subject to SST. SST usually shows up in those areas of a record medium which are repeatedly accessed for recording an erasure; i.e., subject to update in place such as the directory areas of a record medium. On some MO media, SST occurs after 10,000 magnetization reversals, i.e. recording and erasures. The rate of SST will also vary. The SST can occur in only one sector of a track because that one sector is repeatedly erased and rewritten. Which sectors are repeatedly erased and rewritten usually is not logged, therefore it is unknown without performing time consuming tests on such sectors. One way to avoid SST is to assign a predetermined number of calibration tracks such as tracks 29 in FIG. 2. Then within the group of tracks, a track is randomly selected for reducing the effects of repeated calibrations causing SST. Random selection of a track at machine step 117 reduces such SST. Because calibration is so important the number of erasures and rewriting as performed in steps 110 and 111 is recorded as reference R in one of the sectors of the track 30T as seen in FIG. 8. The first machine step 118 after randomly selecting the track at machine step 117 is to read sector R of track 30T and reading the number of reversals in that track. In machine step 118, microprocessor 40 compares the number in sector R of the selected calibration track with a maximum permitted number of calibrations, such as 10,000. If the number R is less than 10,000, then steps 110–116 are performed within that randomly selected track. If the maximum number of calibrations in the randomly selected track exceeds the threshold such that SST may occur, then at machine step 119 microprocessor 40 causes the focus and tracking circuits 54 to move the fine actuator 46 to an adjacent calibration track where at machine step 118 is repeated. This loop can reoccur until a calibration track is found which has less than the maximum number of calibrations performed. Instead of seeking to an adjacent track in machine step 119, another random selection may occur through microprocessor 40's microcode control. Such random track selection can be by a program effected random number selection.

Figure 5:
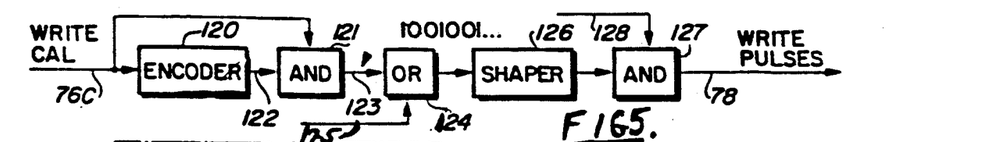
FIG. 5 is a simplified block diagram of a test pattern generator usable for practicing the FIG. 1 illustrated invention.

FIG. 5 shows the generation of the write pattern. The calibration is initiated by microprocessor 40 causing the focus and tracking circuit 54 to move the beam of radiation to one of the calibration tracks in calibration track set 29. Subsequent to machine step 110, microprocessor 40 defines an activating signal over line 76C which is one of the lines in cable 76 of FIG. 2 to activate encoder 120. Encoder 120 when activated repeatedly supplies data pattern 100 over line 122 to AND circuit 121 which is enabled by the activating signal on line 76C. AND circuit 121 passes the repeated generated test pattern 100 over line 123 through OR circuit 124 to pulse shaper 126. Shaper 126 converts the data into write pulses 100, as shown in FIG. 3. AND circuit 127 is enabled by a write enable signal on line 128, received from microprocessor 40, to pass the write pulses to line 78 which then travel to the laser control 66 (FIG. 2) while recording the repeated test pattern. It should be noted that the signal at line 128 enables AND circuit 127 only during the recording area of the respective sectors of a calibration track; that is, each track on disk 30 is divided into sectors which are on radially extending lines equally, angularly spaced apart throughout the circumference of disk 30. For example, each track is divided into 25 sectors. The sectors are separated in a hard sector disk using embossed indicia which indicate the sector number, track number, and the onset of data recording area. Microprocessor 40 indicates to RPS circuit 91 the location of the sector identifications, as well as the recording areas as is known in the disk art. Microprocessor 40 responds to RPS circuit 91 in a known manner for generating a record signal over line 128, which is also a portion of line 76 to data circuit 75. Therefore, the line 78 carried write pulses are timed through angular or rotational position sensing in the usual manner.

Figure 6:
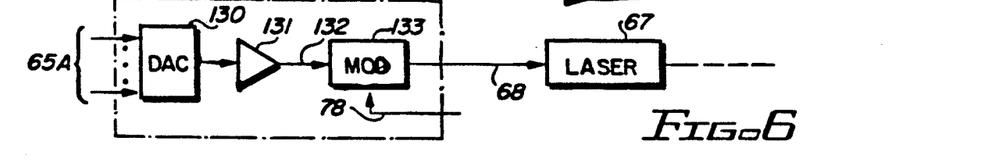
FIG. 6 is a simplified block diagram of a laser control used in connection with practicing the FIG. 1 illustrated invention.

FIG. 6 is a part of control 66 for energizing the laser 67. The recording pulse level is determined by microprocessor 40 by sending a number over cable 65A, a portion of line 65 of FIG. 2, which indicates the desired laser recording power level. Digital to analog converter DAC 130 converts the number on cable 65A into an analog value. Amplifier 131 amplifies the analog value to a predetermined level on line 132. Modulator MOD 133 receives the write pulses over line 78 from the FIG. 5 illustrated circuits. When the write pulses 100 are at a zero level, then modulator 133 is activated to divert the signals on line 132 through a current source switch from laser 67. During such diversion, modulator 133 supplies a minimum laser power activating signal over line 68 to laser 67 which is insufficient to cause a reversal of magnetization in disk 30 as explained with respect to FIG. 2. Whenever write pulses 100 are at level W, then modulator 133 is activated by the write pulses. To remove the current diversion and direct the current from amplifier 131 to laser 67 over line 68. This additional current drive to laser 67 causes it to immediately emit a higher power laser beam for heating the disk 30 in the impinging area of the laser beam above the curry point for reversing the magnetization of the disk 30 at that spot 101, as described with respect to FIG. 2. In usual data recording, the data to be recorded is supplied over line 125 by data circuit 75 in synchronism with the RPS circuits 91 indicating rotational position, all as known. The sequence of writing the patterns and the actual patterns resulting is later described with respect to FIG. 8.

Figure 7:
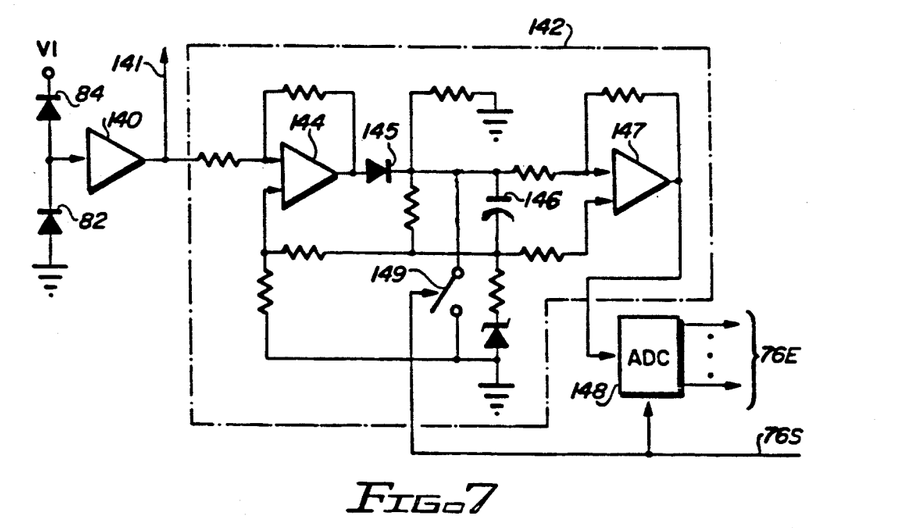
FIG. 7 is a simplified circuit diagram used to envelope detect the average readback signal amplitude when calibrating in accordance with the FIG. 1 illustration.

FIG. 7 illustrates the detection of the recorded test patterns and the resultant generation of indicated readback signal amplitude. FIG. 7 illustrates the operation, in part, of machine step 112 (FIG. 4). The reflected light from disk 30 is split into two beams which respectively impinge upon photodiodes 82 and 84, as best seen in FIG. 2, rather than the separate connections to differential amplifier 85. As shown in FIG. 1, diodes 82 and 84 are connected cascade with the center connection being an input to operational amplifier 140. Operational amplifier 140 outputs readback signal 104, 105 over line 141 to the usual data detection circuits which are located within data circuit 75. Additionally, envelope detector 142 receives readback signal 104, 105 for generating an average signal amplitude as will become apparent. Envelope detector 142 includes amplifier 144, which supplies the readback signal through rectifier 145 to integrator capacitor 146. Integrator capacitor 146 in turn supplies the integrated or averaged value through amplifier 147 to analog to digital converter 148. Analog to digital converter 148 generates a numerical value for the amplitude which is supplied over cable 76E to microprocessor 40. In the constructed embodiment one level of laser write power was used to record the test pattern 100 in a given sector of the disk. Accordingly, when a sector is terminated, microprocessor 40 supplies a signal over line 76S for resetting ADC 148 and squelching integrator 146 as represented by switch 149, all in preparation for reading the next sector containing the test pattern. Microprocessor 40 samples the signals on cable 76E just before sending signals 76S. The operation just described is repeated for each sector of the calibration track or tracks such that microprocessor 40 creates a table of sensed readback signal amplitudes based upon signal envelope integration. Upon completion of the sensing step 112, microprocessor 40 will have a complete table of all sensed values for calculating the mean average value using the curve fitting algorithm described with respect to machine step 113.

The algorithm for recording the diverse laser power level test patterns in machine step 111 is described with respect to the illustrated tracks of FIG. 8. Track 30T is shown as one sequence of diverse laser powers in a single calibration track. It is to be understood that the sectors within track 30T all have the same circumferential length, the sectors being shown of different length to accommodate the symbology representing the signal levels within the respective sectors. Sector R, which is located immediately adjacent to the usual index mark of optical disk, contains the number of times a calibration has occurred on the track for indicating exposure to SST. Erasure step 110 erases all of the sectors except sector R. The laser power is determined by microprocessor 40 activating DAC 130. The value supplied over cable 65A to DAC 130 is incremented at each sector mark represented in FIG. 8 by the vertical lines between the indicated sectors as between sectors R and L. The first recorded test pattern sequence is that a minimum laser 67 power level for recording indicated by the letter L in sector L. Each subsequently recorded sector in the track has an increased laser power level of a predetermined step size. Step size is determined empirically as well as the range of steps is to be determined empirically. As mentioned above, each magnetooptic medium may have different sensitivities based upon differing compositions and the like and other factors. Sensitivity may also vary with ambient temperature in which the disk resides. Generally, the empirical determination will find a minimum and maximum laser power level for use in laser power calibration for writing. In view of changes of laser operation, it is well to calibrate back 30 before doing a write laser calibration, such that it is known the exact laser output for each DAC 130 setting. Various means for calibrating the laser 67 to power level can be employed and are not pertinent to an understanding of the present invention, nor is it absolutely required. In the constructed embodiment, the range of laser power varied from about 5 milliwatt to over 8 milliwatt. The steps of laser power variation from sector to sector was selected to be substantially less than 1 milliwatt, for example about one-fourth milliwatt. The numeral N in FIG. 8 represents the size of the step, for example the minimum laser power such as 5 milliwatt was used to record the test pattern in sector L. In sector L+N the laser power level for recording the test pattern was 5.25 milliwatt, for example. In sector L+2N the laser power used was 5.5 milliwatt, for example. This linear increase occurs throughout track 30T until the maximum laser power M is reached, such as 8.7 milliwatt. Of course the sectors contiguous with sector M have reduced laser power recording, such as M−N and M−2N.

It has also been observed that the sensitivity of a magnetooptic medium may vary from one area of disk 30 to another area of disk 30; therefore, using a single iteration of laser recording power levels may be insufficient to truly find a good average for determining the mean laser power to be used for recording signals in ensuing recording. One procedure for achieving this variation is to first record the calibration track as indicated in FIG. 8 for track 30T. In a subsequent iteration of calibration, the level L may be moved one quadrant or 90 degrees of the track, with the track being rerecorded as in steps 110 and 111 but circumferentially offset. This procedure can be repeated four times resulting in eight reversals of the magnetooptic coating of track 30T for one calibration. A preferred accommodation of variation of aerials recording sensitivity in disk 30 is to provide a plurality of iterations of laser power variation within one recording as occurs in one of the selected tracks of calibration tracks 29. Numerals 160 show zone 1 through zone 4 for providing four iterations of laser power variations within one track before zoning of track 160 is useful, when the aerial variations are frequent.

Increasing the number of zones may require increasing the size of steps of laser power variations between adjacent sectors, which may result in more difficult curve fittings for generating curve 10. In one embodiment two zones, zone A and B, were generated as in track 161 for providing two iterations of laser power variations. In each of the iterations, the laser power has varied from the minimum value L to the maximum value M in a linear sized set of steps for ease in calibrating the laser power level using linear techniques.

While the present description shows a set of calibration tracks 29 at the radially inward most portion of the recording area of disk 30 where at the wavelengths of the shortest and inner symbol interference is the greatest, no limitation thereto is intended. For example, the calibration tracks can be distributed between the radial inward most portion, a middle portion and the regular outward most portion with a track in each of the sets of calibration tracks being randomly selected and the calibration procedure repeated in each of the three sets of calibration tracks. It is preferred, of course, that the tracks be dedicated to calibration. Also included within the scope of the present invention is that when the disk is initially used, a first set of calibration tracks may be dedicated and all other tracks being used for data. At some later date, the data used tracks may be replaced as calibration tracks by a selection procedure which measures the usage of the respective tracks; that is, each sector of the disk may have a counter which counts the number of write accesses for indicating the sensitivity change or SST factor for all of the sectors. During off periods of operation all of the sectors could be read and determined which tracks have the least usage and therefore have the least exposure to SST. Most tracks can then be assigned to the calibration tracks. Since it is preferred to use readily inward most tracks, then an allocation algorithm should be employed for preferring the radially outward most tracks as being tracks first allocated for data usage. Later, as the disk usage proceeds and a defragmentation of data is used for consolidating like data sets, then during such defragmentation the write usage indicators are read with the highest write usage indicator data being moved to the radially outward tracks. For this to operate successfully, two count numbers are required; one for the total count for the respective sector and a second count which is time dependent for the number of updates for the data currently stored in the sector. The defragmentation would take the frequently updated data and store it on a radially outward track for reducing the effect of SST.

While the invention has been particularly shown and described with reference to a preferred embodiment thereof, it will be understood by those skilled in the art that various changes in form and details may be made therein without departing from the spirit and scope of the invention.

What is claimed is:

1. In an optical disk player, the machine effected method of calibrating a laser for recording signals on an optical disk in the player;
   the steps of:
   actuating said laser for recording predetermined signals as machine-sensible marks on the disk at diverse laser power levels of operation whereby said machine-sensible marks recorded at respective ones of said diverse laser power levels upon being optically sensed yield read back signals having different signal amplitudes, respectively and wherein at least one of said read back signal amplitudes is a maximum of all of said read back signal amplitudes;
   in a reading step, machine sensing the machine-sensible marks to generate a read back signal indicative of said sensed machine-sensible marks, measuring the readback signal amplitudes for each of the diverse laser power levels, identifying the laser power level that resulted in a maximum readback signal amplitude; and
   selecting said identified laser power level as a recording power level for said laser to be used in said optical disk player for recording data signals on said optical disk.

2. In the method set forth in claim 1, further including the steps of:
   selecting a disk having tracks with sectors in the tracks; and
   recording said predetermined signals respectively as said machine-sensible marks at said diverse laser power levels in respective ones of said sectors such that each sector has said machine-sensible marks recorded at one of said diverse laser power levels.

3. In the method set forth in claim 2, further including the step of:
   selecting all of said sectors having said machine-sensible marks to be contiguous sectors on the disk.

4. In the method set forth in claim 3, further including the step of:
   changing the laser power levels between adjacent ones of said sectors by a fixed magnitude power level change.

5. In the method set forth in claim 4, further including the steps of:
   selecting a digital to analogue converter (DAC) to supply control signals to the laser to create said diverse laser power levels;

determining the range of control of the DAC in controlling the laser to generate said diverse laser power levels and the number of sectors in which the predetermined signals are to be recorded as said machine-sensible marks, dividing the range of control by the number of sectors to generate an increment value; and changing the diverse laser power levels in adjacent ones of the sectors by said increment value expressed as a fixed number of DAC increment output signal amplitudes.

6. In the method set forth in claim 5, further including the step of:

when reading each of said machine-sensible marks in the respective sectors, generating an average signal envelope amplitude value to be said readback amplitude.

7. In the method set forth in claim 6, further including the steps of:

selecting a maximum frequency of recording; and
selecting said predetermined signals to include signal portions having said maximum frequency of recording.

8. In the method set forth in claim 1, the steps of:

in said recording step, recording said predetermined signals as said machine-sensible marks a predetermined number of repetitions at each of said laser power levels as a set of said repetitions, respectively;

in said reading step, sensing the signal envelope of the read back signal for the respective repetitions including integrating the sensed signal envelope, digitizing the integrated signal amplitude, creating a table of digitized signal values, and using the table of digitized signal values to determine the maximum amplitude read back signal and selecting said laser power level for the laser to conduct ensuing recording.

9. In the method set forth in claim 8, the steps of:

in said recording step, establishing a plurality of said sets of said repetitions, and recording said sets at circumferentially spaced-apart locations on said disk.

10. In the method set forth in claim 9, the steps of:

selecting said circumferentially spaced-apart locations to be circumferentially spaced along one track of the disk, and wherein all said repetitions in each respective set being contiguous in said one track.

11. In the method set forth in claim 1, the steps of:

selecting a d,k code for ensuing recording on the disk, and selecting the predetermined signals to have a plurality of repetitions of the shortest wavelengths in signals modulated using said d,k code.

12. In a method of calibrating an optical disk player having a laser for supplying a laser beam to record signals on an optical disk in the player, the steps of:

actuating said laser for recording on a record track of an optical recording medium predetermined signals as machine-sensible marks on said disk in the disk player at a plurality of recording levels as one iteration of a diverse laser power level sequence wherein recording said predetermined signals at said diverse recording power levels, respectively, such that machine sensing said machine-sensible marks results in read back signals of diverse read back signal amplitudes one of which is a maximal one of said diverse read back signal amplitudes, measuring the amplitude of said readback signals derived from said machine-sensible marks, and selecting one of said recording levels which resulted in said maximal readback signal amplitude as the recording level for said laser beam in ensuing recording on the disk.

13. In the method set forth in claim 12 wherein said optical recording medium is an optical disk having a plurality of radially displaced circular shaped tracks that includes said record track, the steps of:

generating a plurality of said iterations of said laser power level recording sequences, each of said sequences being less than one circumference of one of said circular shaped tracks such that said is recorded a plurality of times at each of said respective laser power levels but at circumferentially displaced locations on the disk.

14. In the method set forth in claim 13, the steps of:

identifying a group of said circular shaped tracks as calibration tracks, and for each time the laser is to be calibrated, randomly selecting a one of the tracks in said group of tracks as a track for recording said predetermined signals.

15. In the method set forth in claim 14, the steps of:

logging the number of times each of the calibration tracks has been used for a calibration;

each time a calibration track is selected for calibration examining the log for reading the number of times such track has been previously used for calibration;

setting a threshold for a maximum number of calibrations to be performed in any one of the calibration tracks; and comparing the logged value for the selected calibration track with said threshold, if the logged value is less than the threshold, using the selected calibration track to calibrate the laser otherwise selecting another one of the calibration tracks.

16. In the method set forth in claim 15, the step of logging the number of times calibrations have been performed in each of the respective calibration tracks, and storing the logging in a retentive store.

17. In an optical disk recorder having optical means for recording signals onto an optical disk and recovering recorded signals from the disk, said optical means being adjustable to record signals on the disks at diverse power levels of recording, said optical means having means to digitize the amplitudes of recovered signals; the improvement including, in combination:

test pattern means for generating a set of predetermined signals having a predetermined sequence of digital values to be recorded on the disk for calibrating the optical means for recording data signals on the disk;

control means having actuating the test pattern means to repeatedly supply said set of predetermined signals for recording and having means to actuate the optical means to record repetitions of said set of predetermined signals at predetermined diverse recording power levels for enabling read back of the recorded signals for measuring the signal amplitudes of said read back signals for the purpose of finding a given recording power level that records signals that result in a read back signal that has a greater amplitude than read back signals derived from signals recorded at ones of said recording power levels other than said given recording power level;

said control means having recovery means for actuating said optical means to recover the recorded sets of said predetermined signals and to digitize the signal amplitudes in each of said read back signals derived from respective ones of the sets of predetermined signals in each said repetition at the respective diverse recording power levels and for supplying same to the control means;

said control means having table means to receive from the recovery means and to accumulate the digitized signals and to evaluate the accumulated signals to identify a maximal one of the digitized signals and to supply a power level indication to the optical means which recorded the set of predetermined signals yielding said maximal one of the digitized signals.

18. In the apparatus set forth in claim 17, further including, in combination:
said disk having a plurality of addressable sectors, and said optical means recording each of said repetitions in a different one of said sectors.

19. In the apparatus set forth in claim 18, further including in combination:
said optical means having signal envelope detecting and integrating means connected to the recovery means for receiving and integrating the recovered recorded sets of predetermined signals before said digitization of the signal amplitudes such that the digitizing of the read back signals is the digitization of the integrated amplitude of the signal envelope.

20. In the apparatus set forth in claim 19, further including, in combination:
said control means having means for repeatedly actuating said optical means to record said repetitions of each said set of predetermined signals a plurality of times in groups of such repetitions, each said group having said recordings of said sets of predetermined signals at each of said diverse power levels and to record such plurality of said groups at circumferentially spaced apart sectors on the disk.

21. In the apparatus set forth in claim 20, further including, in combination:
said disk having a plurality of radially spaced tracks, each track having a predetermined number of said sectors, a predetermined number of said tracks being reserved for calibration of t he optical means; and
said control means having addressing means to select a random one of said calibration tracks for calibrating said optical means.

22. In the apparatus set forth in claim 21, further including, in combination:
said control means having means for logging the number of calibrations in each of said calibration tracks that were performed in the respective tracks and having means for recording and reading such logged numbers; and
compare means having threshold means for comparing the logged number of calibrations for the selected calibration track with said threshold means and operative to allow the calibration to proceed on the selected calibration track if the threshold is not exceeded by said logged number, otherwise aborting the calibration on said selected track.

23. In a method of calibrating a laser for ensuing recording on a magnetooptic disk; the steps of:

identifying a set of tracks on the disk as calibration tracks for calibration of the laser to operate at a predetermined recording power level;
selecting one of the calibration tracks as a predetermined one of said calibration tracks;
calibrating said laser in said predetermined one of the calibration tracks, including actuating the laser for recording a set of predetermined signals having predetermined signal parameter variations in said predetermined one of said calibration tracks, reading the recorded predetermined and analyzing the read predetermined signals for selecting a predetermined power level for operating said laser for recording data on the magnetooptic disk;
logging the number of times each one of said calibration tracks is used for recording power level calibration;
establishing a threshold number of a maximum number of calibrations permitted in each of the calibration tracks;
each time a new calibration is to be made using any one of the calibration tracks, first comparing the threshold number with the logged number of said calibrations for said any one of the calibration tracks, if the threshold number is less than said logged number, aborting the new calibration at said any one of the calibration tracks, otherwise, proceeding with the new calibration using said any one of said calibration tracks.

24. In the method set forth in claim 23, further including the step of:
logging said number of calibrations by recording the number of calibrations in the respective calibration tracks.

25. In the method set forth in claim 24, the steps of:
indicating a given number of write accesses to respective ones of said calibration tracks that create a risk in said magneto optic disk that subsequent write accesses may cause a recording sensitivity shift with respect to time in the magneto optic disk; and
selecting the threshold number to have a value less than said given number for avoiding effects of said sensitivity shift during the write calibration.

26. In the method set forth in claim 24, the steps of:
randomly selecting said one of said calibration tracks as said predetermined one of the calibration tracks; and
when said randomly selected one calibration track has a logged number of calibrations performed in said one calibration track greater than said threshold number, then selecting another one of said calibration tracks that is radially adjacent to said one of the calibration tracks for use in the calibration of write power level.

27. In the method set forth in claim 26, the steps of:
in said selecting step, selecting a given plurality of said calibration tracks for calibrating the laser, each of said selected given plurality of said calibration tracks being respectively disposed at respective radial locations on the disk and one of said selected calibration tracks being said predetermined one of the calibration track;
in said calibrating step, repeatedly recording said set of predetermined signals having predetermined signal parameter variations to include recording ones of the predetermined signals in each set at respective different laser power levels in each of said given plurality of said calibration tracks, in said reading step, reading all of the recorded sets and in said analyzing step, analyzing all of the read recorded sets to determine which of said predetermined laser power levels that recorded said predetermined signals to yield in said reading step read back signals having a greatest read back signal amplitude as a best laser power level, then selecting said best laser level for recording signals on the disk.

28. In the method set forth in claim 27, the steps of:

in said reading step, reading all of the recorded sets including sensing and integrating the signal envelope amplitude of the predetermined signals recorded at each of said laser power levels;

digitizing each of the integrated envelope amplitudes;

then analyzing all of the integrated digitized amplitudes to select a maximum read back signal envelope amplitude; and selecting said maximum read back signal envelope to be said greatest signal amplitude.

* * * * *